(12) United States Patent
Patel

(10) Patent No.: US 7,957,395 B2
(45) Date of Patent: Jun. 7, 2011

(54) SYSTEMS AND METHODS FOR A HYBRID TELEPHONY SERVICE

(75) Inventor: Kiran K. Patel, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 263 days.

(21) Appl. No.: 11/768,683

(22) Filed: Jun. 26, 2007

(65) Prior Publication Data

US 2009/0003561 A1 Jan. 1, 2009

(51) Int. Cl.
*H04M 11/00* (2006.01)

(52) U.S. Cl. .............. 370/395.3; 370/352; 379/93.05; 379/218.01

(58) Field of Classification Search .......... 370/352–356; 455/445, 461, 426.1; 379/218.01
See application file for complete search history.

(56) References Cited

U.S. PATENT DOCUMENTS

| 6,937,596 | B2 * | 8/2005 | Sjolund et al. | 370/352 |
| 2007/0110038 | A1 * | 5/2007 | Sakata | 370/352 |
| 2007/0127679 | A1 * | 6/2007 | Matsuhashi et al. | 379/218.01 |
| 2007/0167156 | A1 * | 7/2007 | Hundal | 455/426.1 |
| 2007/0201432 | A1 * | 8/2007 | Sood et al. | 370/352 |
| 2007/0238472 | A1 * | 10/2007 | Wanless | 455/461 |

* cited by examiner

*Primary Examiner* — Robert W Wilson
*Assistant Examiner* — Mohamed Kamara

(57) ABSTRACT

The systems and methods for a hybrid telephony service may provide a plurality of user accounts that each user may have a circuit-based telephony service identifier, a packet-based telephony service identifier and a mapping instruction for the user account. The systems and methods for a hybrid telephony service may further provide a service control component to query the user account database to retrieve the mapping instruction for a telephony service identifier.

13 Claims, 7 Drawing Sheets

200

Hybrid Telephony Service User Account

| User | Circuit-based Landline Telephony Service Identifier (HTN) | Circuit-based Wireless Telephony Service Identifier (MTN) | Mapping Instruction | Packet-based Telephony Service Identifier (VTN) |
|---|---|---|---|---|
| 101 | 123-456-7890 | 222-333-4444 | HTN to MTN | 123-555-6666 |
| 201 | 111-222-3333 | N/a | HTN to VTN | 123-555-6667 |

Mapping Instruction Associated with Telephony Messages

| Telephony Message | Mapping Instruction |
|---|---|
| *99 | HTN to VTN |
| *98 | HTN to MTN |
| *97 | MTN to HTN |
| *96 | HTN to VTN with delay |
| *95 | HTN to MTN with delay |
| *94 | MTN to HTN with delay |
| *89 | Stop mapping HTN to VTN |
| *88 | Stop mapping HTN to MTN |
| *87 | Stop mapping MTN to HTN |

FIG. 3

SYSTEMS AND METHODS FOR A HYBRID TELEPHONY SERVICE

BACKGROUND INFORMATION

A circuit-based landline telephone remains the primary home telephone for many people. However, new technology, such as voice over packet-based network, has started to attract some users to switch over to telephony services that are delivered through a packet-based network. Currently, circuit-based landline telephony service providers (TSPs) do not provide users a packet-based telephony service.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which:

FIG. 2 is a table of hybrid telephony service user accounts according to an exemplary embodiment;

FIG. 3 is a table of mapping instructions with corresponding telephony signaling messages according to an exemplary embodiment;

Figure 1:
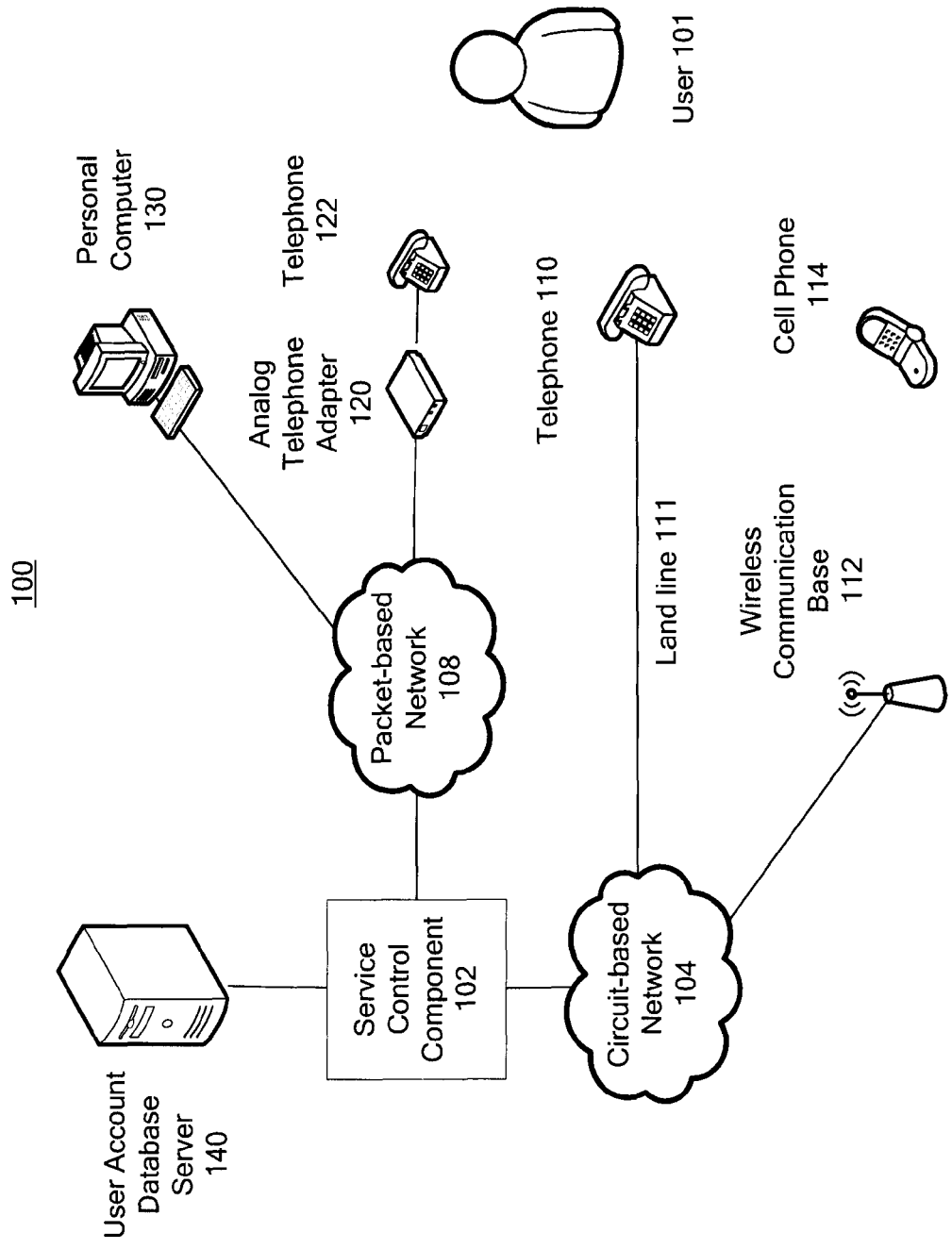
FIG. 1 is a schematic diagram of a system for implementing a hybrid telephony service according to an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

Landline and wireless telephony services may be delivered through a circuit-based network. On the circuit-based network, each communication session between a calling and a receiving telephony device may be carried by a dedicated end-to-end circuit path. In recent years, packet-based telephony service providers started to provide packet-based telephony service, e.g., a VoIP telephony service. Typically, a packet-based telephony service may have features such as, but not limited to, a lower long distance calling rate compared to landline telephony service, and location mobility. If a landline telephony service user has a packet-based network service such as, but not limited to, a Digital Subscriber Line (DSL) service, the landline telephony service provider may also provide the user a packet-based telephony service and let the user use a hybrid telephony service According to exemplary embodiments, described below, systems and methods may provide a hybrid telephony service that provides both circuit-based telephony services and packet-based telephony services. The circuit-based telephony services may be identified by circuit-based telephony service identifiers, such as a telephone number associated with a landline and/or a telephone number associated with a wireless telephony device. The telephone number associated with a landline may be referred to as a Home Telephone Number (HTN) and the telephone number associated with a wireless telephony device may be referred to as a Mobile Telephone Number (MTN), respectively, in the present disclosure. The packet-based telephony service may be identified by a packet-based telephony service identifier such as, but not limited to, a VoIP telephone number, an identifier of a packet-based voice communication service, or a unique identifier of a packet-based telephony device. The packet-based telephony service identifier may be referred to as a Virtual Telephone Number (VTN) in the present disclosure. The systems and methods may record a user's telephony service identifiers (e.g., HTN, MTN, VTN) in a user account.

The systems and methods may allow the user to map one telephony service identifier to another, such as, but not limited to, map HTN to VTN, map HTN to MTN, or map MTN to HTN, etc. Thus, if the user chooses to map a first telephony service identifier to a second telephony service identifier, the user can receive a telephone call to the first telephony service identifier on a telephony device associated with the second telephony service identifier. Also, under the same mapping, when the user makes a telephone call from the telephony device associated with the second telephony service identifier, the first telephony service identifier may be designated as an originating telephony service identifier.

Users of hybrid telephony service may get features associated with circuit-based landlines such as, but not limited to, reliability, and quality of communication signals. Also these users may get features associated with the packet-based telephony service such as, but not limited to, lower cost for long distance calls and mobility. Another feature of the hybrid telephony service may be associating a landline telephone number with a packet-based telephony service, thus enabling users to receive telephone calls to the user's home telephone number anywhere they may have a connection to a packet-based network. This feature of the hybrid telephony service may also let landline users to make lower cost long distance phone calls on a packet-based network with the home landline telephone number as the originating telephone number. Furthermore, if a hybrid telephony service user has the packet-based network service such as, but not limited to, a DSL service, with the user's landline TSP, the user may have a single bill for multiple services, e.g., a landline telephony service, a DSL service, and a packet-based telephony service.

The description below provides a discussion of servers, computers, and other devices that may perform one or more functions, which may be implemented using software, firmware, hardware, and/or various combinations thereof. It is noted that a function described herein as being performed at a particular device may be performed at one or more other devices instead of or in addition to the function performed at the particular device. Further, the devices may be local or remote to one another.

FIG. 1 is a schematic diagram of a system for implementing a hybrid telephony service according to an exemplary embodiment. It is noted that other devices may be included in FIG. 1, and that the devices shown may be integrated and/or separated. As shown in FIG. 1, system 100 may provide a hybrid telephony service to one or more users 101. User 101 may receive telephony services on both Circuit-based Network 104 and Packet-based Network 108. One telephony service provided through Circuit-based Network 104 may be identified by a circuit-based telephone number associated with the home landline 111 (HTN). At one end, the landline 111 may connect to a regular telephone 110 at the user's premise, e.g., a landline analog signaling telephone; at the other end, the landline 111 may connect to the Circuit-based Network 104. The Circuit-based Network 104 may connect to a Service Control Component 102 hosted at a Central Office of a TSP. Any hybrid telephony service user may also have a circuit-based wireless telephony device such as, but not limited to, a cell phone, a Personal Digital Assistant (PDA), or any other wireless telephony device. The wireless telephony device may be connected to a circuit-based network through a wireless communication base. For example, user 101 may have a cell phone 114 connected to the Circuit-based Network 104 through a wireless communication base 112. The circuit-based telephony service provided by wireless telephony service may be identified by a wireless telephone number associated with the cell phone 114 (MTN).

A landline telephony service user may also have a packet-based network service, e.g., a DSL service, and thus may have access to a packet-based telephony service. In the example of FIG. 1, user 101 may receive a packet-based telephony service through an Analog Telephone Adapter 120 connected to a Packet-based Network 108. An analog telephone adapter may convert packet-based telephony signals into analog telephony signals and analog telephony signals into packet-based telephony signals. Typically, the analog telephone adapter has a unique identifier that a packet-based TSP may identify. The Packet-based Network 108 may connect to the Service Control Component 102. User 101 may use a regular telephone 122 to connect to the Packet-based Network 108 through the Analog Telephone Adapter 120. User 101 may also have a VTN such as, but not limited to, a VoIP telephone number, a unique identifier of the Analog Telephone Adapter 120, or a service account identifier of a packet-based voice communication service. The TSP may record the user's HTN, MTN and VTN to a hybrid telephony service account. The hybrid telephony service account may be stored on a User Account Database Server 140.

A hybrid telephony service user may choose other alternative devices to use the packet-based telephony service. Such alternative devices may include, but are not limited to, personal computers or laptops with a speaker and microphone, or any communication device capable of receiving and/or transmitting packet-based telephony signals. For example, as shown in FIG. 1, user 101 may use a personal computer 130 to connect to the Packet-based Network 108. The personal computer 130 may be a computer with software that enables the computer to be used as a telephony device. The computer based telephone may be referred to as a softphone.

A user need not be aware of the user's VTN because the hybrid telephony service may allow the user to map the user's HTN to the VTN and use the HTN when the user uses the packet-based telephony service. A user may present a single telephone number to other people, e.g., the user's HTN, and may have mobility for the HTN. For example, user 101 may choose to map the user's HTN to the user's VTN and may use the HTN when user 101 uses the packet-based telephony service. Referring back to FIG. 1, when the Service Control Component 102 receives a request to establish a telephone communication session with user's HTN, it may query a hybrid telephony service user account database. The query may be processed by the User Account Database Server 140. The Service Control Component 102 may determine that user has mapped the HTN to the user's VTN. The Service Control Component 102 may then route the telephone call request to the Packet-based Network 108, and through the Analog Telephone Adapter 120 to generate ring signals on the telephone 122. In this embodiment, the Analog Telephone Adapter 120 and the telephone 122 may be located at the user's premise.

The Packet-based Network 108 may have a geographically wide reach. The wide reach of the Packet-based Network 108 may allow a user of a hybrid telephony service to bring the user's landline home phone number with the user during travels, e.g., international travels. For example, user 101 may travel to a different country and bring the Analog Telephone Adapter 120 with him. User 101 may connect the Analog Telephone Adapter 120 to the Packet-based Network 108 in a hotel room, an office, or any location with a connection to the Packet-based Network 108. The user then may use any regular telephone plugged to the Analog Telephone Adaptor 120 to receive telephone calls to the user's HTN and may make telephone calls using the HTN as the originating telephone number as described later. Alternatively, user 101 may use a softphone and therefore would not need the Analog Telephone Adapter 120.

A mapping of a HTN to a VTN may also make the HTN location transparent for outgoing telephone calls. That is, if a HTN is mapped to a VTN, a Service Control Component of a TSP may substitute the VTN with the HTN as the originating telephone number for outgoing telephone calls originated on a telephony device associated with the VTN. Therefore, the HTN may have the mobility associated with the VTN. Referring back to FIG. 1, user 101 may dial a telephone number on the telephone 122. When the Service Control Component 102 receives the outgoing telephone call, it may determine that user 101 has a mapping of "HTN to VTN" and may replace the user's VTN with the user's HTN as the originating telephone number. A telephony device receiving the call may display the HTN as the originating telephone number, if the telephony device has a caller ID feature. Thus, the location mobility associated with the VTN makes the HTN location mobile and this mobility is transparent to the other party of a telephone communication session. This feature will be discussed in detail later.

A hybrid telephony service user with both landline (i.e., HTN) and wireless (i.e., MTN) telephony services may also map between these two telephony services, such as map HTN to MTN or map MTN to HTN, etc. For example, user 101 may choose to map HTN to MTN during a trip to Miami. When Service Control Component 102 receives a request to establish a telephone communication session with the user's HTN, the request may be routed to the Cell Phone 114. Therefore, user 101 may receive telephone calls to the HTN on the Cell Phone 114 while the user may be on the beach. If the user makes an outgoing telephone call from the beach on the Cell Phone 114, the Service Control Component 102 may process the outgoing telephone call at the Central Office and use the user's HTN as the originating telephone number. Under this mapping, whenever user 101 uses the Cell Phone 114, air time minutes would be consumed as any mobile operations. In another example, user 101 may choose a mapping of MTN to HTN while the user is at home, and then start receiving telephone calls to the user's Cell Phone 114 at the regular telephone 110 connected to home landline 111. This mapping may help user 101 to save airtime minutes for the Cell Phone 114 and may let user 101 have a better quality of service on the landline.

In above described mappings, a hybrid telephony service may further provide to generate ring signals at a telephony device associated with a dialed telephony service identifier before routing to a mapped telephony service identifier. For example, if user 101 has a mapping of HTN to VTN, user 101 may let the Service Control Component 102 generate four (4) ring signals on the landline 111 before routing an incoming telephone call to the user's VTN. The hybrid telephony service may provide corresponding mapping instructions such as "HTN to VTN with delay," "HTN to MTN with delay" and "MTN to HTN with delay," etc.

FIG. 2 is a table of hybrid telephony service user accounts according to an exemplary embodiment. As shown in FIG. 2, user 101 may have a HTN of 123-456-7890, a MTN of 222-333-4444, a mapping instruction of "HTN to MTN" and a VTN of a 123-555-6666. User 101's mapping instruction may direct the Service Control Component 102 to route all incoming phone calls targeting the HTN to a telephony device associated with the MTN and use the HTN as the originating telephone number when user 101 makes telephone calls from the telephony device associated with the MTN. Airtime may be consumed when user 101 receives telephone calls using the telephony device associated with the MTN even though the called telephone number may be the HTN. Also, airtime may be consumed when user 101 makes telephone calls using the telephony device associated with the MTN even though the originating telephone number may be shown to the other party as the HTN. User 201 is a user with a HTN and no MTN. User 201 may choose a mapping instruction of "HTN to VTN" to have all incoming phone calls to the user's HTN routed to a telephony device associated with the user's VTN and use the HTN as the originating telephone number when making telephone calls from the telephony device associated with the VTN.

FIG. 3 is a table of mapping instructions with corresponding telephony signaling messages according to an exemplary embodiment. A user of a hybrid telephony service may choose from a variety of ways to make a selection of a mapping instruction for the user's HTN and/or MTN. For example, a user may dial a sequence of digits on a telephony device associated with the user's HTN to make the selection of mapping instructions. A Service Control Component receiving the telephony signaling message may store corresponding mapping instructions to the hybrid telephony service user account associated with the originating HTN. According to FIG. 3, for example, user 101 using telephone 110 may dial a sequence of digits such as, *99 to choose "HTN to VTN,"*98 to choose "HTN to MTN,"*97 to choose "MTN to HTN,"*96 to choose "HTN to VTN with delay,"*95 to choose "HTN to MTN with delay,"*94 to choose "MTN to HTN with delay."

Table 300 also lists sequences of digits to terminate mapping. A user may dial the sequence of digits to terminate mapping on a telephony device associated with the user's HTN or VTN. For example, on telephone 110, user 101 may dial *89 to "Stop mapping HTN to VTN", *88 to "Stop mapping HTN to MTN", or *87 to "Stop mapping MTN to HTN." In another implementation, a TSP may let a user enter the same sequence of digits to toggle a mapping instruction. For example, a *99 may be "HTN to VTN," but a repeat of *99 may toggle off the mapping. In such embodiment, a message such as *89 of "Stop mapping HTN to VTN" may not be necessary.

In another embodiment, a TSP may allow a user to use an Internet website to change the user's account mapping settings. As is well known, a TSP or other service providers, such as a utility service provider, may allow users to log into a website associated with the service provider to change users' account settings. Similarly, a user may log into a telephony service account management Internet website associated with the TSP to change the user's account mapping settings.

When a user dials a telephony signaling message that a Service Control Component cannot find a corresponding mapping instruction, the message may be ignored or a recorded message may play. For example, a user may dial a telephony signaling message of *93. The Service Control Component cannot find a corresponding mapping instruction and may ignore the message. The Service Control Component may also determine a mapping instruction is not proper for the hybrid telephony service user account, and ignore the message or play a recorded message. For example, the second user according to FIG. 3, User 201, has no MTN, so if the user dials *98 or *97 on a telephony device associated with the user's HTN, neither corresponding mapping instruction is proper for the User 201's telephony service user account. Thus, the message may be invalid and ignored by the Service Control Component 102.

Figure 4:
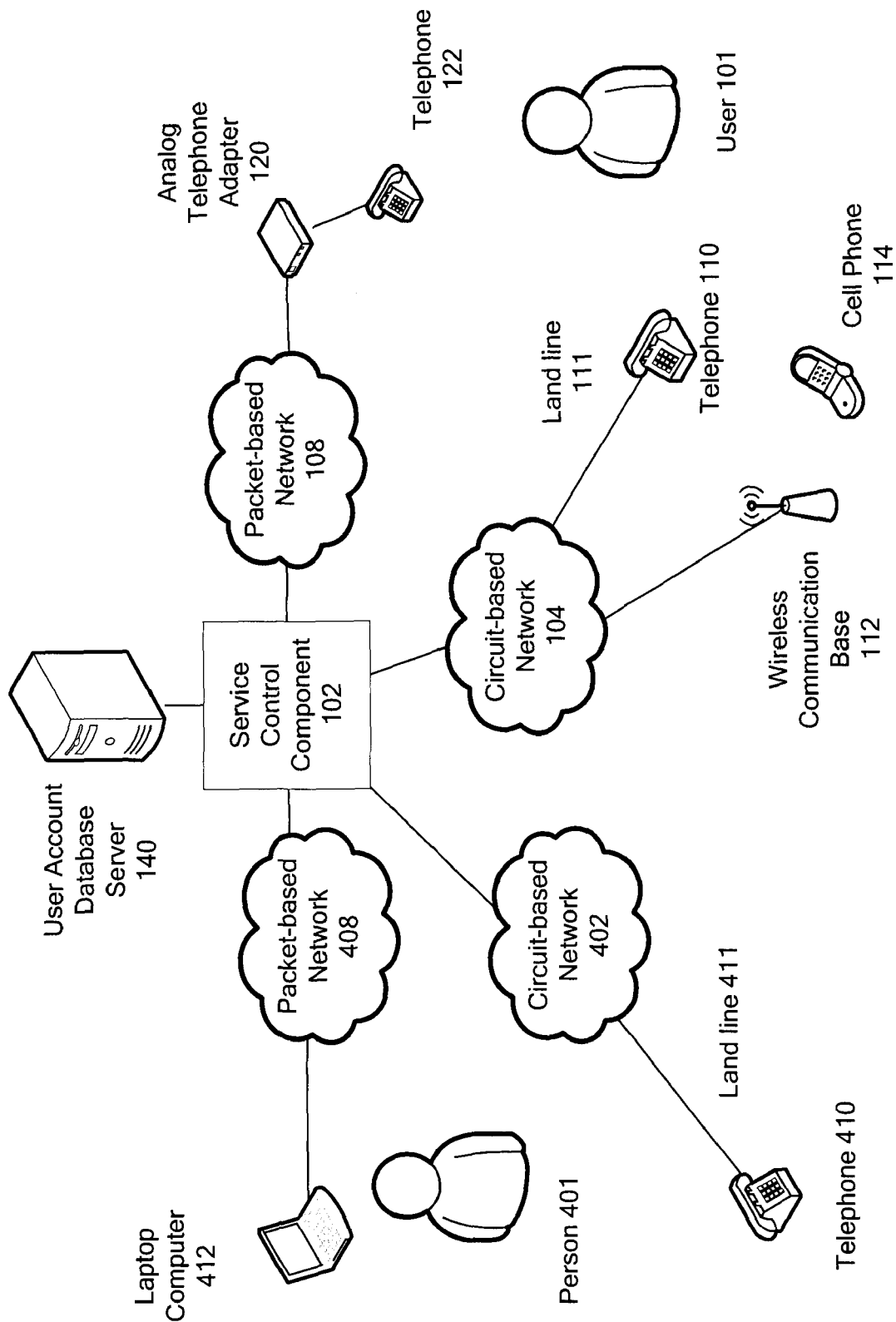
FIG. 4 is a schematic diagram of a system for establishing a communication session between a third party telephony device and a telephony device associated with a telephone number of a hybrid telephony service user account according to an exemplary embodiment.

FIG. 4 is a schematic diagram of a system for establishing a communication session between a third party telephony device and a telephony device associated with a telephone number of a hybrid telephony service user account according to an exemplary embodiment. A third party person may use a telephony device connected to a circuit-based network to call a landline telephone number of a hybrid telephony service user account. For example, a person 401 may initiate a telephone call to user 101 by dialing a telephone number associated with landline 111, e.g., HTN. The Service Control Component 102 may receive the dialed telephone number from the Circuit-based Network 402 and query the User Account Database Server 140. The Service Control Component 102 may determine that the HTN is mapped to the VTN for user 101 if user 101 has a mapping instruction of "HTN to VTN" in the user account. Accordingly, the Service Control Component 102 may convert the telephony signaling message from a circuit-based signaling message (e.g., Signaling System 7 Initial Address Message) to a packet-based signaling message. For example, the packet-based signaling message may be a Session Initiation Protocol (SIP) INVITE message including a called VoIP telephone number 123-555-6666, i.e., user 101's VTN, for establishing a SIP dialog over the Packet-based Network 108. The SIP INVITE message may be transmitted through the Packet-based Network 108 to the Analog Telephone Adapter 120, which may cause the telephone 122 to generate ring signals. If user 101 picks up the telephone 122 in response to the ringing, a communication session is initiated and the two parties may communicate.

A user may also use a telephony device associated with the user's VTN to make telephone calls. If the user's HTN is mapped to the VTN, the HTN may be used as the originating number for the outgoing telephone call. For example, in the system shown in FIG. 4, user 101 using telephone 122, may dial a telephone number associated with person 401. The telephone 122 may transmit the dialing telephony signals to the Analog Telephone Adapter 120, which converts the telephony signals into packet-based signals such as a SIP INVITE message including the dialed telephone number. The SIP INVITE message may be transmitted to the Service Control Component 102. The Service Control Component 102 may query a user accounts database in User Account Database Server 140 and determine there is a "HTN to VTN"

mapping for the originating VTN and then substitute the VTN to the user's HTN as the originating telephone number. The Service Control Component 102 may convert the SIP INVITE message to a circuit-based signaling message (e.g., Signaling System 7 Initial Address Message), and forward the telephony signaling message to the Circuit-based Network 402. The Circuit-based Network 402 may transmit the telephony signaling message to the landline 411 and generate ring signals on the telephone 410.

The person 401 may make a telephone call to the user 101's HTN from a laptop 412, which may be equipped with a speaker and a microphone. The laptop 412 may connect to the Packet-based Network 408 and may be a softphone with a VoIP telephone number. To set up a communication session, the laptop 412 may send a SIP INVITE message containing the user 101's HTN as a dialed telephone number to the Packet-based Network 408. The SIP INVITE message may be transmitted to the Service Control Component 102, which may query the User Account Database Server 140 and determine there is a mapping instruction of "HTN to VTN" for the dialed HTN. The Service Control Component 102 may then route the message through the Packet-based Network 108 coupled to the Analog Telephone Adapter 120.

The person 401 may be a user of a second TSP. As is well known, telephony service providers may collaborate with each other to route telephone calls. Therefore, the TSP of user 101 may collaborate with the second TSP to route telephone calls between them. Mapping of phone numbers of user 101 occurs at the Service Control Component 102, so the second TSP may not be aware of the mapping and may not treat the telephone calls to or from the user's telephone number differently.

Figure 5:
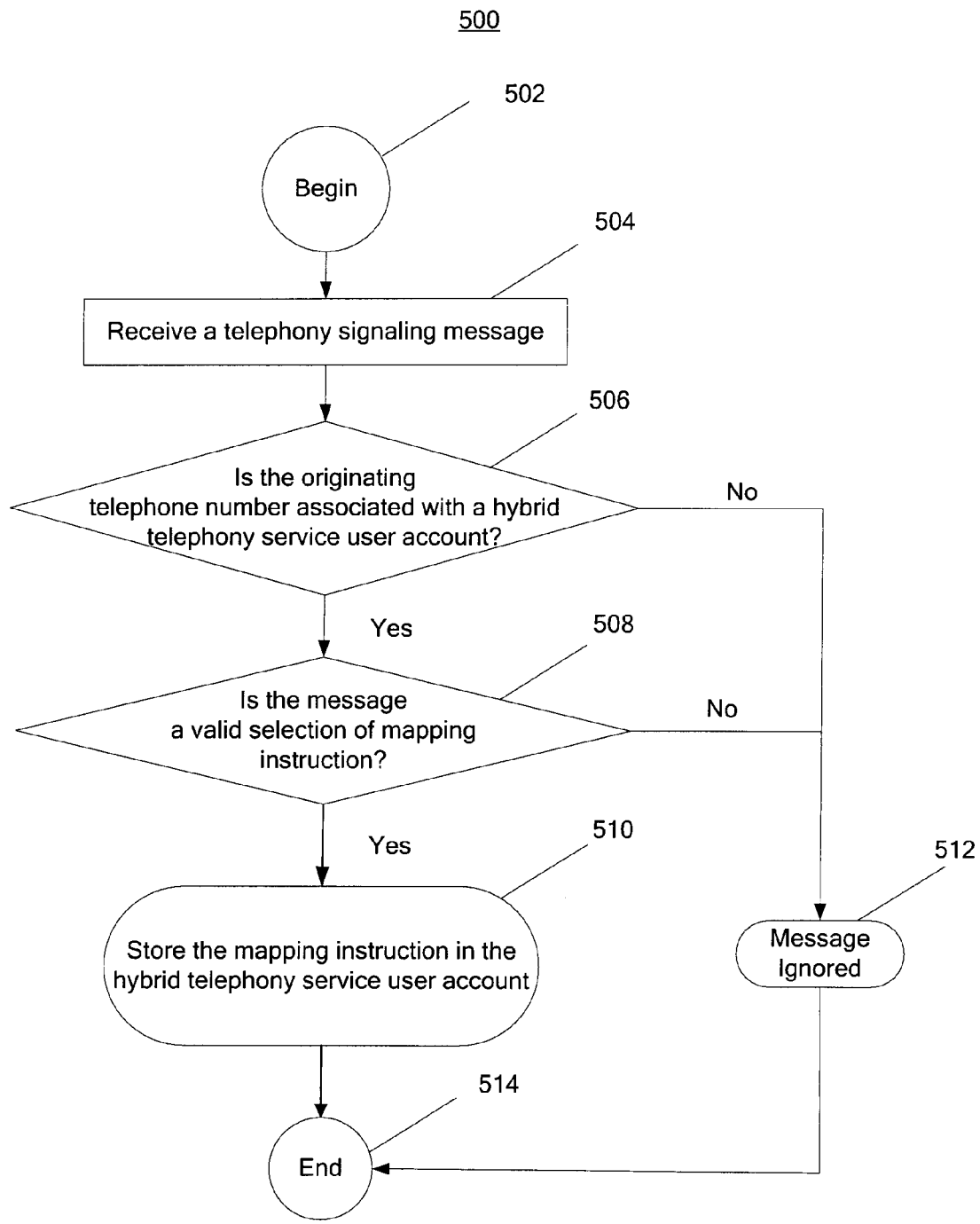
FIG. 5 is a flow diagram of a method for receiving and processing a request to select a mapping instruction for a hybrid telephony service user account according to an exemplary embodiment.

FIG. 5 is a flow diagram of a method for receiving and processing a request to select a mapping instruction for a hybrid telephony service user account according to an exemplary embodiment. The method 500 may begin at block 502 and may continue to block 504. In block 504, a Service Control Component may receive a telephony signaling message to select a mapping instruction for the telephony service identifier associated with the originating telephony device. For example, the telephony signaling message may start with a "*" signal so that the Service Control Component may identify the signaling message as a selection of a mapping instruction. Referring to FIG. 1, the Service Control Component 102 may receive a *99 message of FIG. 3 originating from the telephone 110. The method 500 then may continue to block 506.

In block 506, the Service Control Component may query a hybrid telephony service user account database to determine whether the originating telephone number is associated with a hybrid telephony service user account. The received telephony signaling message may contain a telephony service identifier of the originating telephony device. The Service Control Component may query a hybrid telephony service user account database with the telephony service identifier. For example, if the *99 signaling message of FIG. 3 is received through the Circuit-based Network 104 from the telephone 110, the Service Control Component 102 may query a hybrid telephony service user account database on User Account Database Server 140 to determine whether the circuit-based telephone number associated with landline 111 has a hybrid telephony service. If yes, the method 500 may continue to block 508. If no, the method 500 may continue to block 512.

In block 508, the Service Control Component may determine whether the signaling message is a valid selection of a mapping instruction. If the user account has only one circuit-based telephony service identifier, valid selection of mapping instruction may be "HTN to VTN," "HTN to VTN with delay," or "Stop mapping HTN to VTN." For example, for User 201 of FIG. 2, the Service Control Component 102 may verify that the dialed signaling message is one of *99, *96, or *89 according to FIG. 3, because User 201 has no MTN. In another example, the user may have both HTN and MTN, such as user 101 of FIG. 2. If user 101 dials a signaling message on the telephone 110, the Service Control Component 102 may verify that the dialed signaling message is one of *99, *98, *97, *96, *95, *94, *89, *88, or *87 according to FIG. 3. If the dialed signaling message corresponds to a valid mapping instruction, the method 500 may continue to block 510. If the dialed signaling message corresponds to an invalid mapping instruction, the method 500 may continue to block 512.

In block 510, the Service Control Component may store the selected mapping instruction in the hybrid telephony service user account associated with the originating telephony service identifier. For example, the Service Control Component 102 may identify the signaling message as *99 coming from telephone 110, therefore, the Service Control Component 102 records a mapping instruction of "HTN to VTN" for the telephone number 123-456-7890 in a hybrid telephony service user account database table such as table 200. The method 500 may then continue to block 514 and end.

In block 512, the Service Control Component may ignore the signaling message because either the signaling message did not originate from a telephony service identifier associated with a hybrid telephony service account, or the message is not a valid selection of a mapping instruction. For example, a user may have only a HTN, such as User 201 in FIG. 2, but may enter *98 through a telephony device associated with the HTN. The Service Control Component 102 may receive the signaling message but may find it as an invalid selection of a mapping instruction for the User 201, therefore, the signal may not be processed further. The method 500 may then continue to block 514 and end.

Figure 6:
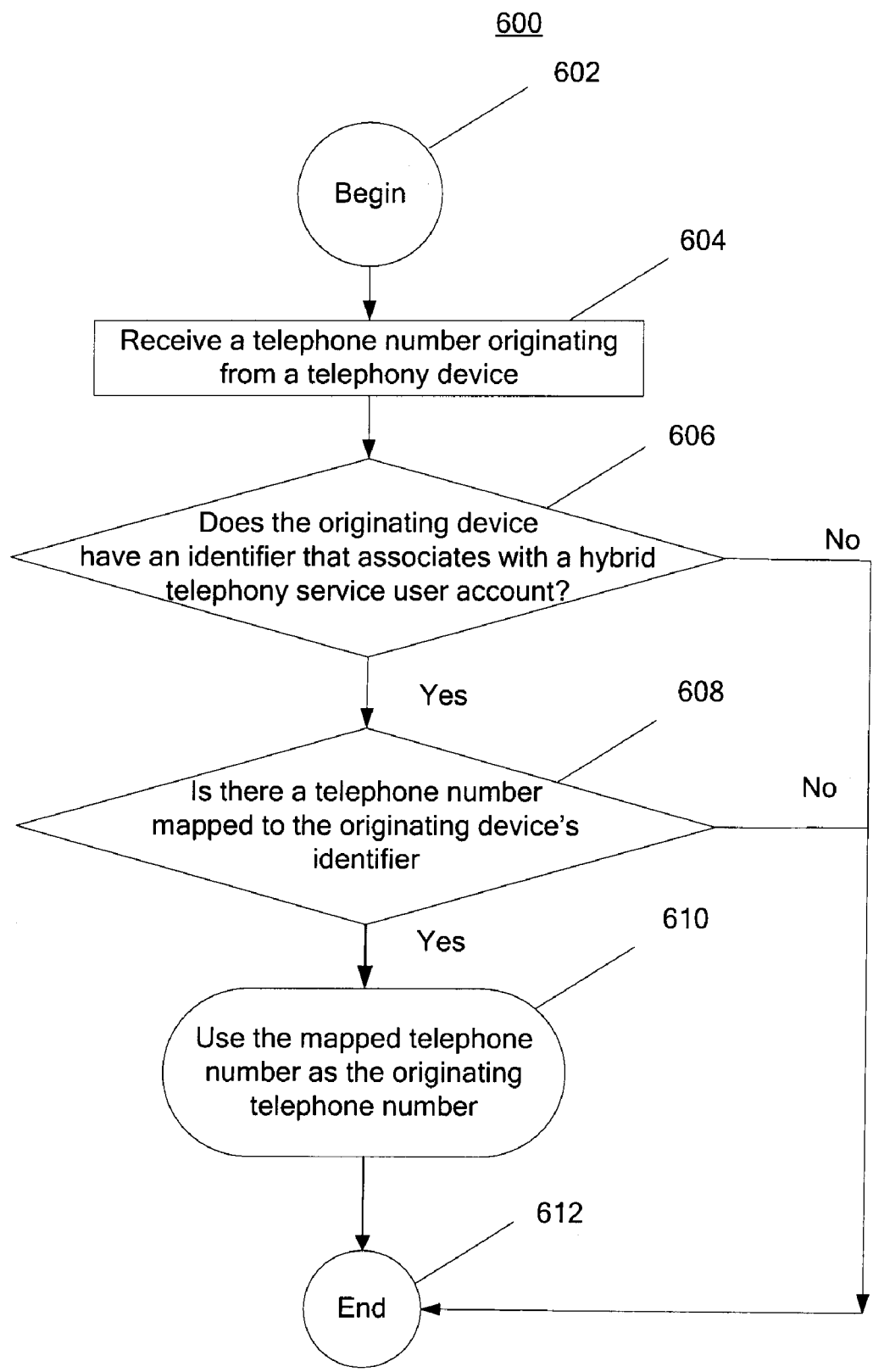
FIG. 6 is a flow diagram of a method for receiving and processing a dialed telephone number originating from a telephony device that has a telephony service identifier associated with a hybrid telephony service user account according to an exemplary embodiment.

FIG. 6 is a flow diagram of a method for receiving and processing a dialed telephone number originating from a telephony device that has a telephony service identifier associated with a hybrid telephony service user account according to an exemplary embodiment. The method 600 may begin at block 602 and may continue to block 604. In block 604, a Service Control Component may receive a dialed telephone number from a telephony device. For example, the Service Control Component 102 of FIG. 1 may receive a dialed telephone number from the cell phone 114. The method 600 may then continue to block 606.

In block 606, the Service Control Component may query a hybrid telephony service user account database to determine whether the originating telephony device has an identifier that associates with a hybrid telephony service user account. For example, if the Service Control Component 102 receives a dialed a telephone number from the cell phone 114, it may determine the originating telephony device has a circuit-based wireless telephone number of 222-333-4444 and query a hybrid telephony service user account database stored on User Account Database Server 140 to determine whether the originating telephone number is associated with a hybrid telephony service user account. If the originating telephony device has an identifier that associates with a hybrid telephony service user account, the method 600 may continue to block 608. If the originating telephony device has an identifier that does not associate with a hybrid telephony service user account, the method 600 may continue to block 612 and end.

In block 608, the Service Control Component may determine whether there is a telephone number mapped to the originating telephony device's identifier. In the above example, after receiving a dialed telephone number from cell phone 114, Service Control Component 102 may query a hybrid telephony service user account database table of FIG. 2 stored on the User Account Database Server 140. The Service Control Component 102 may determine that the originating telephone number 222-333-4444 is a MTN for user 101 and that there is a mapping instruction of "HTN to MTN" for the user account. If there is another telephone number mapped to the originating telephone number, the method 600 may continue to block 610. If there is no other telephone number mapped to the originating telephone number, the method 600 may continue to block 612 and end.

In block 610, the Service Control Component may use the mapped telephone number as the originating telephone number. Continuing the above example, the Service Control Component 102 may use the mapped telephone number HTN of 123-456-7890 to substitute the wireless telephone number VTN of 222-333-4444 as the originating telephone number. Therefore, if the receiving end of the telephone call has a caller ID feature, HTN 123-456-7890 may be shown as the originating telephone number. The method 600 may then continue to block 612 and end.

Figure 7:
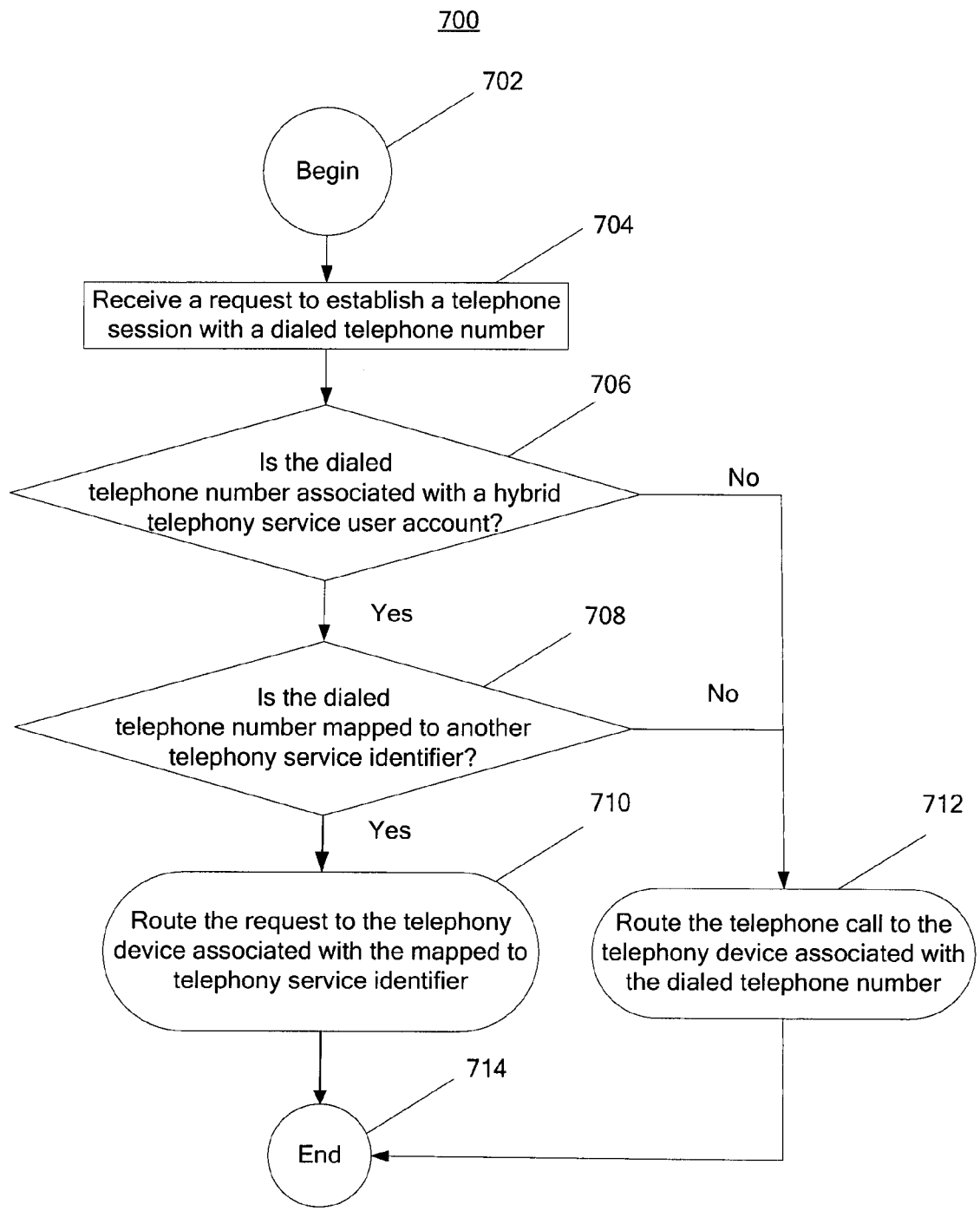
FIG. 7 is a flow diagram of a method for receiving and processing a request to establish a telephone communication session with a telephone number associated with a hybrid telephony service user account according to an exemplary embodiment.

FIG. 7 is a flow diagram of a method for receiving and processing a request to establish a telephone communication session with a telephone number associated with a hybrid telephony service user account according to an exemplary embodiment. The method 700 may begin at block 702 and may continue to block 704. In block 704, a Service Control Component may receive a request to establish a telephone session with a telephone associated with the dialed telephone number. For example, in FIG. 4, Service Control Component 102 may receive a request to establish a telephone session with the HTN of user 101 when person 401 dials the user's HTN on telephone 410. The method 700 may then continue to block 706.

In block 706, the Service Control Component may determine whether the dialed telephone number is associated with a hybrid telephony service user account. For example, referring to FIG. 4, if the person 401 dials the telephone number 123-456-7890 (i.e., HTN of user 101) on the telephone 410, the Service Control Component 102 may receive a request to establish a telephone communication session with a telephone associated with the dialed telephone number. The Service Control Component 102 may query a hybrid telephony service user account database on the User Account Database Server 140 to determine whether the dialed telephone number is associated with a hybrid telephony service user account. If yes, the method 700 may continue to block 708. If no, then the method 700 may continue to block 712.

In block 708, a Service Control Component may determine whether the dialed telephone number is mapped to another telephony service identifier. For example, the user 101 may have the user's HTN mapped to a MTN of 222-333-4444 according to FIG. 3. The Service Control Component 102 may query a hybrid telephony service user account database on the User Account Database Server 140 to determine the mapping. If the dialed telephone number is mapped to second telephone number, the method 700 may continue to block 710. If the dialed telephone number is not mapped to a second telephone number, the method 700 may continue to block 712.

In block 710, a Service Control Component may route the telephone call to the telephony device associated with the mapped telephony service identifier. Continuing with the previous example, according to FIG. 2, the Service Control Component 102 may identify the dialed HTN being mapped to the MTN of 222-333-4444, therefore, the Service Control Component 102 may route the telephone call to the cell phone 114. The method 700 may then continue to block 714 and end.

In block 712, a Service Control Component may route the telephone call to the telephony device associated with the dialed telephone number. A dialed telephone number may not be associated with any hybrid telephony service user account, or the dialed telephone number may be associated with a hybrid telephony service user account but there is no mapping instruction affecting the dialed telephone number. For example, user 101 may choose to stop mapping the user's HTN to the user's MTN and no mapping is set for the HTN when Person 401 dials the HTN. The Service Control Component 102 may receive the dialed telephone number and realize no mapping is in effect for the dialed telephone number. The Service Control Component 102 may route the telephone call to the landline 111 and user 101 may get ring signals on the telephone 110. The method 700 may then continue to block 714 and end.

In previous descriptions in the present disclosure, the calling and receiving telephony devices of a telephone communication session may both have telephony service identifiers associated with hybrid telephony services. A Service Control Component may perform necessary hybrid telephony service operations such as, but not limited to, mapping, or routing for both originating telephony service identifier and the dialed telephony service identifier when establishing and maintaining a telephone communication session.

Also in previous descriptions in the present disclosure, a hybrid telephony service may be implemented by a single service provider. The systems and methods disclosed in the present disclosure may also be implemented by multiple service providers, such that, a first service provider may provide the circuit-based landline telephony service, a second service provider may provide circuit-based wireless telephony service and a third service provider may provide a packet-based telephony service. The circuit-based telephony service providers and packet-based telephony service providers may implement a collaborated hybrid telephony service. For example, a first TSP may provide a circuit-based landline telephony service to a User A with a HTN, a second TSP may provide User A a circuit-based wireless telephony service with a MTN, and a third TSP may provide a packet-based telephony service to the same user with a VTN. The three TSPs may collaborate to provide a hybrid telephony service to User A. The first TSP may store a hybrid telephony service account database at a User Account Database Server and provide a webservice for the second and third TSPs to access the User Account Database Server. When a call to the HTN of User A is received by a Service Control Component of the first TSP, it may query the hybrid telephony service account database. If a mapping of HTN to MTN or VTN exists, the Service Control Component of the first TSP may route the call to a Service Control Component of the second or third TSP respectively, which may forward the call to a telephony device associated with User A's MTN or VTN. When User A makes a call from the telephony device associated with the user's MTN or VTN, the Service Control Component of the second or third TSP may access the hybrid telephony service account database through the webservice. If a mapping of HTN to MTN or VTN exists, the Service Control Component of the second or third TSP may forward the telephone call to a Service Control Component of the first TSP respectively. The Service Control Component of the first TSP may substitute the originating telephone number of User A's MTN or VTN with User A's HTN and route the telephone call to the dialed telephone number.

Thus, a hybrid telephony service may be provided by a single TSP or collaborating multiple TSPs on both circuit-based and packet-based networks. The hybrid telephony service may provide users the reliability and quality of service associated with a circuit-based landline telephony service. Moreover, the hybrid telephony service may provide users features associated with a packet-based telephony service such as, but not limited to, the ability to be location independent, low rate for long distance call, etc. Furthermore, by allowing users to map one telephone number to another telephony service identifier, the hybrid telephony service may provide mobility to the home landline telephone number. A user with hybrid telephony service may travel and still receive telephone calls to the home landline telephone number at any location with a connection to a packet-based network.

In the preceding specification, various exemplary embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system comprising:
a database server comprising a plurality of user accounts, each user account comprising:
a circuit-based telephony service identifier, wherein the circuit-based telephony service identifier comprises a telephone number associated with a landline.
a packet-based telephony service identifier, wherein the packet-based telephony service identifier comprises at least one of a VoIP telephone number and a unique identifier of an analog telephone adapter or a unique identifier of a softphone, and
a mapping instruction, wherein the mapping instruction comprises one of the following: instructions for mapping the circuit-based telephony service identifier to the packet-based telephony service identifier, and instructions for no mapping: and
a service control component communicatively coupled to a circuit-based network, a packet-based network and the database, wherein the service control component is configured to process a query to search the database for a telephony service identifier and retrieve the mapping instruction associated with the corresponding user account of the telephony service identifier from the database.

2. The system of claim 1, wherein each user account is a hybrid telephony service user account.

3. The system of claim 1, wherein the service control component is further configured to route telephone calls targeting or originating from the telephony service identifier according to the retrieved mapping instruction.

4. The system of claim 1, wherein the mapping instruction is one of the following: mapping the circuit-based telephony service identifier to the packet-based telephony service identifier, and no mapping.

5. The system of claim 1, wherein the user account further comprises a second circuit-based telephony service identifier.

6. The system of claim 5, wherein the second circuit-based telephony service identifier is a wireless mobile telephone number associated with a wireless telephony device.

7. The system of claim 5, wherein the mapping instruction is one of the following: mapping the circuit-based telephony service identifier to the second circuit-based telephony service identifier, mapping the second circuit-based telephony service identifier to the circuit-based telephony service identifier, mapping the circuit-based telephony service identifier to the packet-based telephony service identifier and no mapping.

8. The system of claim 1, wherein the mapping instruction is received through a telephony device associated with the circuit-based telephony service identifier or a telephony service account management Internet website.

9. The system of claim I, wherein the packet-based telephony service identifier is associated with one of the following: an Analog Telephone Adaptor, a softphone, and a telephone configured to receive Internet Protocol packets.

10. A method comprising:
receiving a telephony signaling message from a telephony device associated with a circuit-based telephony service identifier;
identifying that the circuit-based telephony service identifier is associated with a hybrid telephony service user account;
determining the telephony signaling message is a valid selection of a mapping instruction for the hybrid telephony service user account; and
recording the mapping instruction in the hybrid telephony service user account;
wherein the telephony device associated with the circuit-based telephony service identifier comprises a telephone connected to a landline, and
wherein the hybrid telephony service user account has one circuit-based telephone number and a valid mapping instruction comprises at least one of following: instructions for mapping the circuit-based telephony service identifier to the packet-based telephony service identifier, and instructions for no mapping.

11. The method of claim 10, wherein the hybrid telephony service user account has a circuit-based telephone number and a second circuit-based telephone number, and a valid mapping instruction is one of following: mapping the circuit-based telephony service identifier to the second circuit-based telephony service identifier, mapping the second circuit-based telephony service identifier to the circuit-based telephony service identifier, mapping the circuit-based telephony service identifier to the packet-based telephony service identifier and no mapping.

12. A method comprising:
receiving a dialed telephone number originating from a first telephony device;
identifying a first telephony service identifier associated with the first telephony device and an associated hybrid telephony service user account;
determining a second telephony service identifier is mapped to the first telephony service identifier; and
using the second telephony service identifier as an originating telephone number;
wherein the first telephony service identifier is a circuit-based telephony service identifier or a packet-based telephony service identifier, wherein the circuit-based telephony service identifier comprises a telephone number associated with a landline and the packet-based telephony service identifier comprises at least one of a VoIP telephone number and a unique identifier of an analog telephone adapter or a unique identifier of a softphone, and a mapping instruction, wherein the mapping instruction comprises one of tile following: instructions for mapping the circuit-based telephony service identifier to tile packet-based telephony service identifier, and instructions for no mapping.

13. A method comprising:

receiving a request to establish a telephone session with a dialed telephone number;

identifying the dialed telephone number is associated with a hybrid telephony service user account:

identifying the dialed telephone number is mapped to a second telephony service identifier in the hybrid telephony service user account;

routing the request to a telephony device associated with the second telephony service identifier;

wherein the second telephony service identifier is a circuit-based telephony service identifier or a packet-based telephony service identifier, wherein the circuit-based telephony service identifier comprises a telephone number associated with a landline and the packet-based telephony service identifier comprises at least one era VoIP telephone number and a unique identifier el: an analog telephone adapter or a unique identifier of a softphone, and a mapping instruction, wherein the mapping instruction comprises one of tile following: instructions for mapping the circuit-based telephony service identifier to tile packet-based telephony service identifier, and instructions for no mapping.

\* \* \* \* \*